(12) United States Patent
Hara

(10) Patent No.: US 6,997,384 B2
(45) Date of Patent: Feb. 14, 2006

(54) METHOD FOR DISPLAYING AND READING INFORMATION CODE FOR COMMERCIAL TRANSACTION

(75) Inventor: Masahiro Hara, Nagoya (JP)

(73) Assignee: Denso Wave Incorporated, Tokyo (JP)

( * ) Notice: Subject to any disclaimer, the term of this patent is extended or adjusted under 35 U.S.C. 154(b) by 212 days.

(21) Appl. No.: 10/614,900

(22) Filed: Jul. 9, 2003

(65) Prior Publication Data

US 2004/0012569 A1 Jan. 22, 2004

(30) Foreign Application Priority Data

Jul. 19, 2002 (JP) .................................... 2002-211038

(51) Int. Cl.
G06K 7/10 (2006.01)

(52) U.S. Cl. ............... 235/454; 235/462.09; 235/462.1
(58) Field of Classification Search ................ 235/454, 235/462.01, 462.09, 462.1, 383, 375, 354, 235/472.01

See application file for complete search history.

(56) References Cited

U.S. PATENT DOCUMENTS

| | | | | |
|---|---|---|---|---|
| 4,254,400 A | * | 3/1981 | Yoda et al. .................. 382/194 |
| 4,459,611 A | * | 7/1984 | Arai et al. .................... 380/243 |
| 4,481,602 A | * | 11/1984 | Bohrer et al. ................... 708/1 |
| 4,633,506 A | * | 12/1986 | Kato ........................ 382/236 |
| 4,728,784 A | * | 3/1988 | Stewart .................. 235/462.07 |
| 4,964,066 A | * | 10/1990 | Yamane et al. ............. 345/441 |
| 5,047,868 A | * | 9/1991 | Takeda et al. .............. 386/109 |
| 5,278,398 A | * | 1/1994 | Pavlidis et al. ......... 235/462.12 |
| 5,296,691 A | * | 3/1994 | Waldron et al. ....... 235/462.12 |
| 5,387,787 A | * | 2/1995 | Waldron et al. ....... 235/462.12 |
| 5,414,251 A | * | 5/1995 | Durbin .................... 235/462.2 |
| 5,481,103 A | * | 1/1996 | Wang ........................ 235/494 |
| 5,513,264 A | * | 4/1996 | Wang et al. ................... 380/51 |
| 5,608,862 A | * | 3/1997 | Enokida ..................... 345/501 |
| 5,631,457 A | * | 5/1997 | Fukuda et al. ........... 235/462.1 |
| 5,659,167 A | * | 8/1997 | Wang et al. ............ 235/472.01 |
| 5,767,845 A | * | 6/1998 | Oashi et al. ............... 715/500.1 |
| 5,770,841 A | * | 6/1998 | Moed et al. ................ 235/375 |
| 5,777,310 A | * | 7/1998 | Liu et al. ............... 235/462.12 |
| 5,825,905 A | * | 10/1998 | Kikuchi ....................... 382/113 |
| 5,835,100 A | * | 11/1998 | Matsufusa ................... 345/467 |
| 5,940,844 A | * | 8/1999 | Cahill et al. ................. 715/526 |
| 5,979,768 A | * | 11/1999 | Koenck ........................ 235/470 |
| 6,587,216 B1 | * | 7/2003 | Yamada ...................... 358/1.11 |
| 6,637,658 B2 | * | 10/2003 | Barber et al. ........... 235/462.45 |
| 6,637,662 B2 | * | 10/2003 | Itou et al. .............. 235/472.01 |
| 6,685,095 B2 | * | 2/2004 | Roustaei et al. ........ 235/472.01 |
| 6,722,565 B2 | * | 4/2004 | Takeuchi et al. ............ 235/454 |
| 6,735,740 B2 | * | 5/2004 | Sakai et al. ................ 382/176 |
| 6,744,537 B1 | * | 6/2004 | Chiba et al. ................ 358/473 |

FOREIGN PATENT DOCUMENTS

| | | | | |
|---|---|---|---|---|
| JP | 07143450 A | * | 6/1995 |
| JP | 08214153 A | * | 8/1996 |
| JP | 2001-188846 | | 7/2001 |
| JP | 200292532 | | 3/2002 |
| JP | 2002-109420 | | 4/2002 |
| JP | 2002109421 A | * | 4/2002 |
| JP | 2002111809 A | * | 4/2002 |
| JP | 2003006570 A | * | 1/2003 |
| WO | WO 0227587 | | 4/2002 |

* cited by examiner

Primary Examiner—Michael G. Lee
Assistant Examiner—Uyen-Chau N. Le
(74) Attorney, Agent, or Firm—Posz Law Group, PLC

(57) ABSTRACT

An optical information reader for settling a commercial transaction reads and decodes with certainty a quick response (QR) code displayed on a buyer's mobile telephone display. A QR code 11 is displayed on the display a plurality of times at a prescribed time interval. The QR code is rotated by 90° every time. Therefore, a part of the QR code which could not have been decoded due to a mirror reflection, stains or scratches on the display can be decoded at the second, third or fourth display, because the QR code 11 is displayed four times at different angles.

8 Claims, 15 Drawing Sheets

ALONG LINE α

ALONG LINE β

ALONG LINE γ

METHOD FOR DISPLAYING AND READING INFORMATION CODE FOR COMMERCIAL TRANSACTION

BACKGROUND OF THE INVENTION

1. Field of the Invention

The present invention relates to a method for displaying information code on a display device and a method for optically reading the displayed image, when a commercial transaction is to be settled by the information code such as a quick response (QR) code.

2. Description of the Related Art

Recently, commercial contracts are being settled in such a place as a convenience store where buyers bring their debit notes forwarded from a seller and pay the charges.

The above-mentioned conventional settlement requires a document such as a debit note. However, settlements without using any document can be formulated in order to simplify the settlement.

For example, when a commercial contract is made, the seller transmits to the buyer's mobile telephone the coded debit information together with letter (character) information. Then, the buyer shows that information received on the mobile telephone display at a convenience store. The optical information reader in that convenience store optically reads and then decodes the various information on the mobile telephone display. Thus, the transactions are completed by a buyer's payment of the charge.

Concretely, in JP 2001-188846A, members and stores are registered in an internet server. A buyer's member goes to a seller's store and settles his or her contract which has already concluded through the internet, by showing contract information on his or her mobile telephone, thereby completing the commercial transaction.

Further, in JP 2002-109420A, a buyer transfers his or her charge to a bank account of the seller by using automatic transaction machine (ATM), receives the transferring information from the ATM and goes to the seller where the buyer's transferring information including a QR code is read into the seller's POS (point of sales) terminal, thereby completing the commercial transaction.

However, the above-mentioned optical information reader has a disadvantage that the information codes can neither be recognized nor decoded, when the display surface is bruised or unclean, or when the illumination light happens to be is partially mirror-reflected by the display surface.

Further, the display device of the mobile telephone has a disadvantage that the information quantity is not so large due to a smallness of the display surface and due to a limited capability of an application software for settling the payments.

SUMMARY OF THE INVENTION

An object of the present invention is to decode the information displayed on a display of a buyer's mobile, even when the display device is bruised and unclean, or even when a partial mirror-reflection of an illumination light is caused on the display surface. Another object is to display and read a large information, even when the display surface is small.

The present invention has thirteen Features as stated below.

In Feature 1, the method for displaying an image of information code for a commercial transaction comprises the steps of:

displaying the image;
changing the image; and
displaying the changed image.
wherein:
the images are displayed a plurality of times at a prescribed time interval; and
each of the images is moved by a prescribed quantity.

A part of an image of an information on a display device can not be picked up by an optical reader, if an mirror refelection is caused on the display device, or if the display device is bruised or stained. However, in Feature 1, the image is displayed a plurality of times and is moved at each display. Accordingly, the unreadable portion of the image is also moved at each display. Therefore, the unreadable portion at a first display can be picked up at a display later than second. Therefore, a complete image without any unreadable portion can be obtained by combining a plurality of images displayed the plurality of times.

In Feature 2, the image is rotated at every display.

In Feature 3, the image is shifted in parallel at every display.

In Feature 4, the image is scaled up or down. 1, wherein the changing step is a step for changing a size of the image.

In Feature 5, when there are one or more displayed images which includes an unrecognizable part, the unrecognizable part is compensated by other displayed image wherein the unrecognizable part is clearly displayed.

In Feature 6, the displayed image is a partial image divided from an original image of an information code for the commercial transaction.

According to Feature 6, even a large image which can not be displayed as it is can be displayed on a small display area of the mobile telephone.

In Feature 7, each of the partial images includes a code indicating a dividing number or code indicating an order for displaying the partial images.

According to Feature 7, the divided images are easily combined.

In Feature 8, each of the partial images is moved by a prescribed quantity.

According to Feature 8, similarly to Feature 1, the complete image can be picked up in spite of the mirror reflection, scratches or stains.

In Feature 9, the partial image is rotated at every display.

In Feature 10, the partial image is shifted in parallel at every display.

In Feature 11, the partial image is enlarged or reduced at every display.

In Feature 12, the image reading method further comprises the steps of:

reading optically the partial images;
decoding the partial images; and
combining the decoded partial images in order that the original image is decoded.

In Feature 13, the image reading method according to Feature 12 is provided. When there are one or more displayed partial images which includes an unrecognizable part, the unrecognizable part is compensated by other displayed partial image wherein the unrecognizable part is clearly displayed.

According to the present invention, even the images of the large QR code 26 can be displayed on the small LCD 8 and can be picked up and decoded with certainty, even when there is a mirror reflection, stains, or scratches on the small display such as LCD 8.

PREFERRED EMBODIMENTS OF THE INVENTION

Figure 1A:
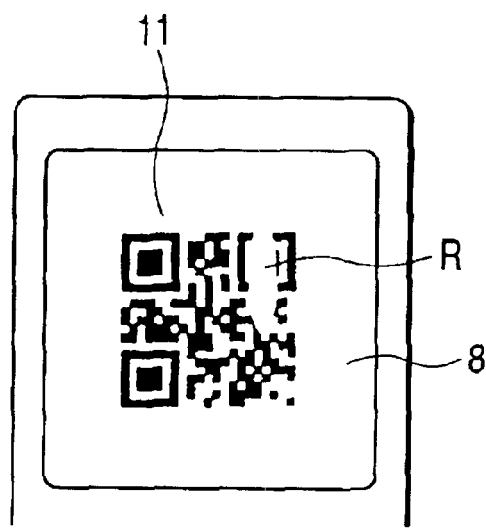
FIGS. 1A to 1D show images of a quick response (QR) code (displayed on a display of a buyer's mobile telephone) a plurality of times at a prescribed time interval in Embodiment 1, wherein the QR code is rotated by, e.g., 90° at every display.

Preferred embodiments are explained, referring to the drawings.

Embodiment 1

Embodiment 1 is explained, referring to FIGS. 1 to 9.

Figure 9:
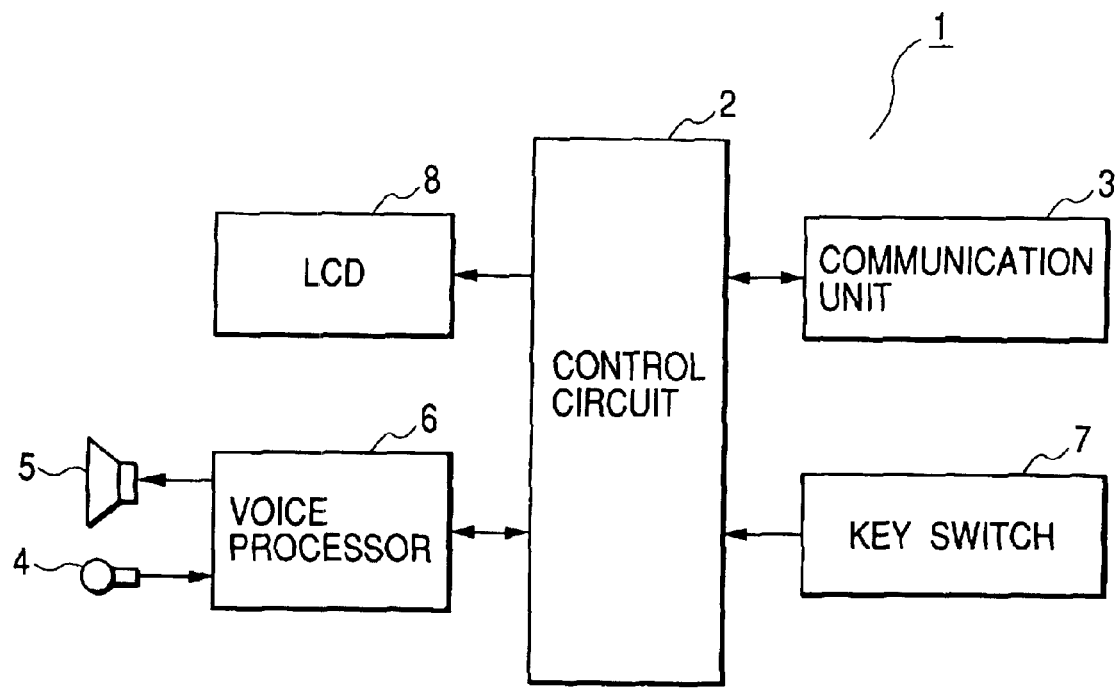
FIG. 9 is a blocck diagram of the mobile telephone as shown in FIG. 8.

FIG. 9 is a block diagram of a mobile telephone for displaying information code image. In a mobile telephone 1, a control circuit 2 is connected with: a telephone communication unit 3 for telephone communication through base station in a mobile communication network; a voice processing (coding, decoding and so on) unit 6 having a microphone 4 for called voice signal and a a speaker 5 for calling voice signal; a key switch group 7 having a plurality of key switches for call start & call end and numerical key for inputting telephone numbers; and such a display device 8 such as liquid crystal display (LCD) for displaying the caller telephone number and the information code image.

The mobile telephone 1 may display such information code as a quick response (QR) code which is one of the 2-dimensional codes. Further, the control unit 2 is a micro computer system including CPU, ROM, RAM and I/O.

Figure 8:
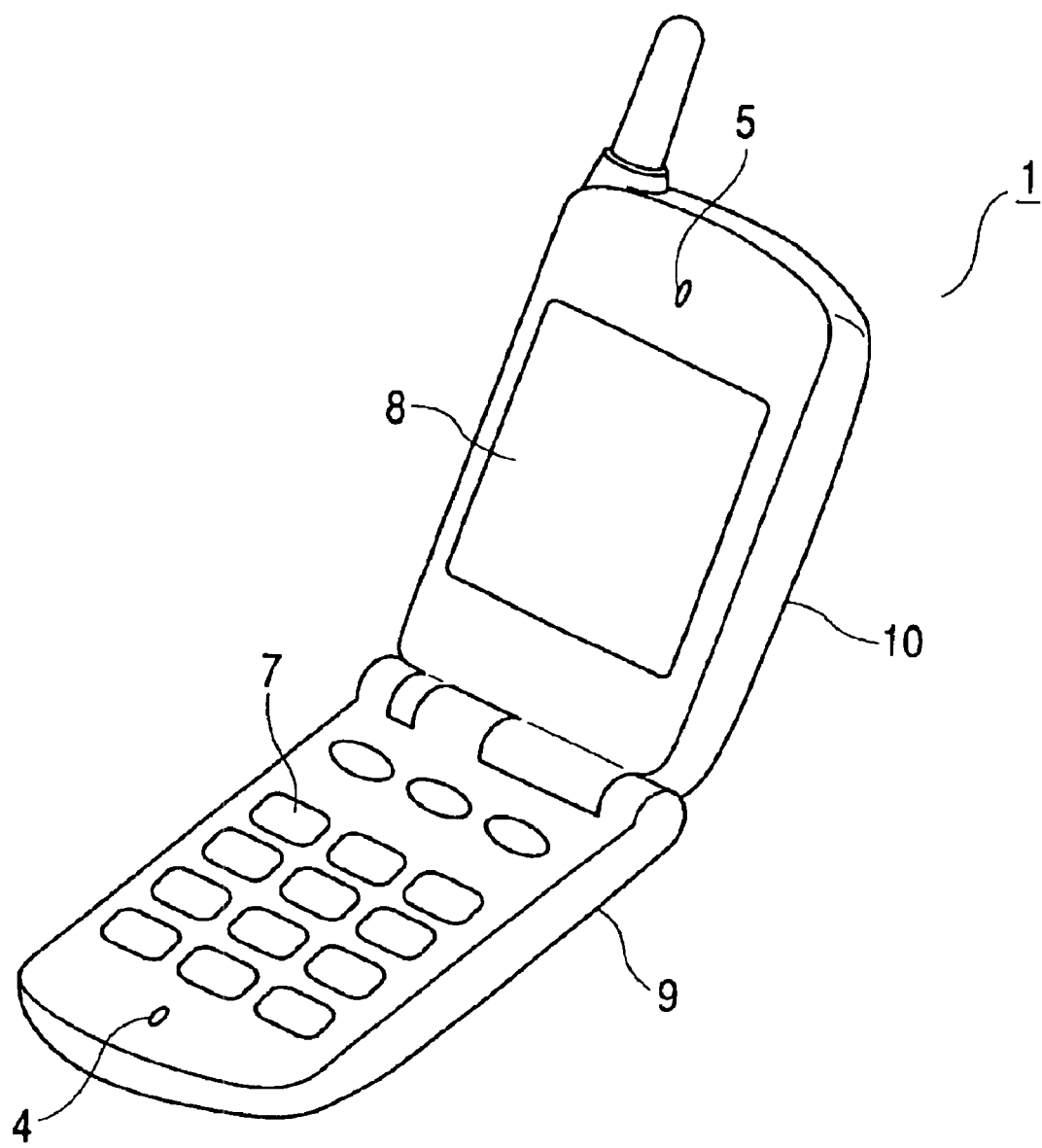
FIG. 8 is a perspective view of a mobile telephone.

FIG. 8 is a perspective view of the mobile telephone 1, which is foldable, wherein body 9 is pivotally connected with a a flipper 10. There are disposed on a surface of the body 9 covered by the flipper 10 the key switch group 7, the microphone 4 for inputting the voice to the called and so on, while there are disposed on a surface of the flipper covered by the body 9 the display device 8, the speaker 5 for outputting the voice from the calling and so on.

The mobile telephone 1 can be used for settling commercial transactions through, e.g., a convenience store. In the settling system using the mobile telephone 1, the debit data is transmitted from the seller to the buyer's mobile telephone 1 in twofold way of letter data and QR code data. The buyer received the debit data, attends the convenience store of which optical information reader reads the QR code data on the display 8 of the buyer's mobile telephone 1. Then, when the convenience store received the charge from the buyer, the convenience store notifies the seller of the settlement, through a network such as the public switched telephone network (PSTN) or the Internet.

Figure 5:
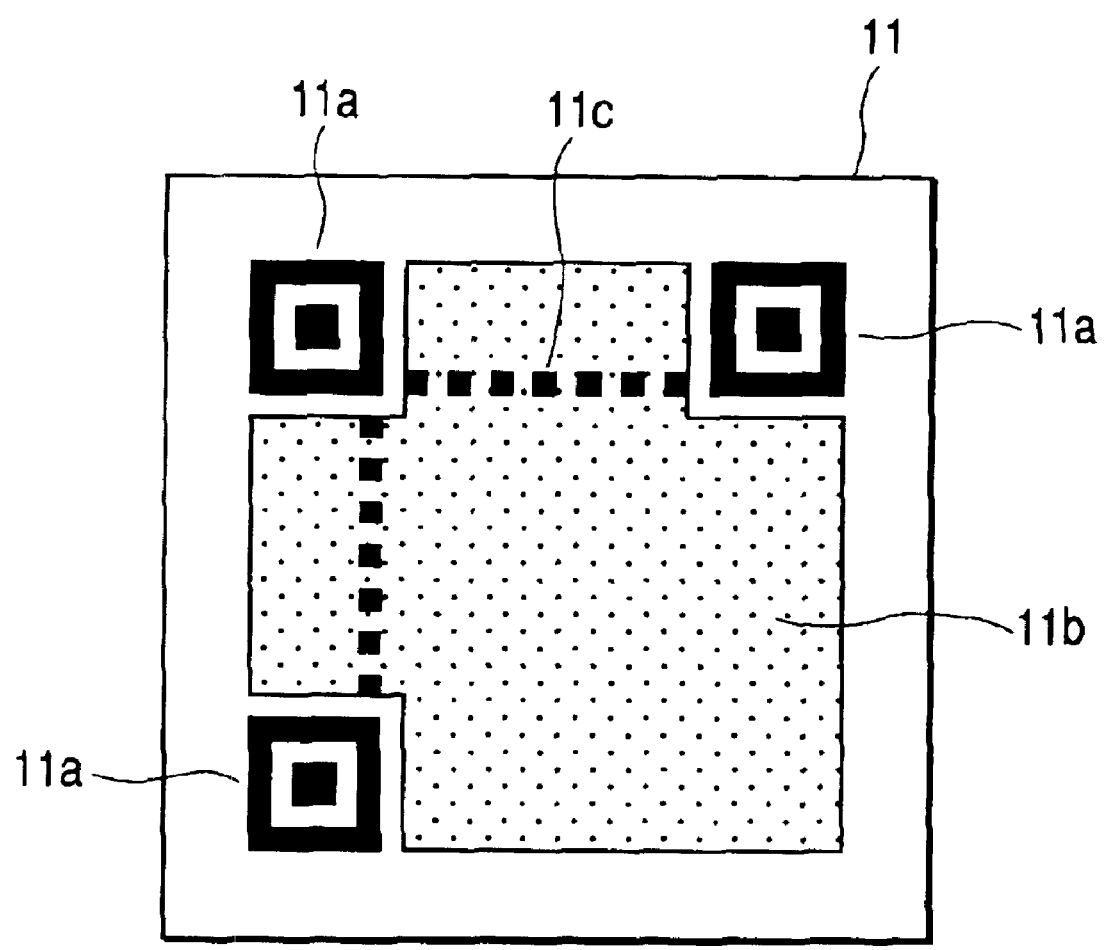
FIG. 5 shows a QR code.

The QR code 11 as shown in FIG. 5 comprises three cut-out symbols 11a, a data region 11b and a timing pattern 11c, wherein they are arranged in a square in such a manner that a longitudinal cell number is made the same as a transverse cell number. Each cell is one of the two different types which are distinguished by white (bright) and black (dark) in the drawings. Further, cell patterns are omitted for simplicity in FIG. 5.

The cut-out symbols 11a are disposed at the three corners of the four corners of the square. As shown in FIG. 6, there is the cut-out symbols 11a a black square C in a white square B in a black square A. There are in the data region 11b data expressed by white and black cells together with Reed-Solomon code data for error checking. The timing pattern 11c is used for obtaining the coordinates of the QR code.

Figure 7:
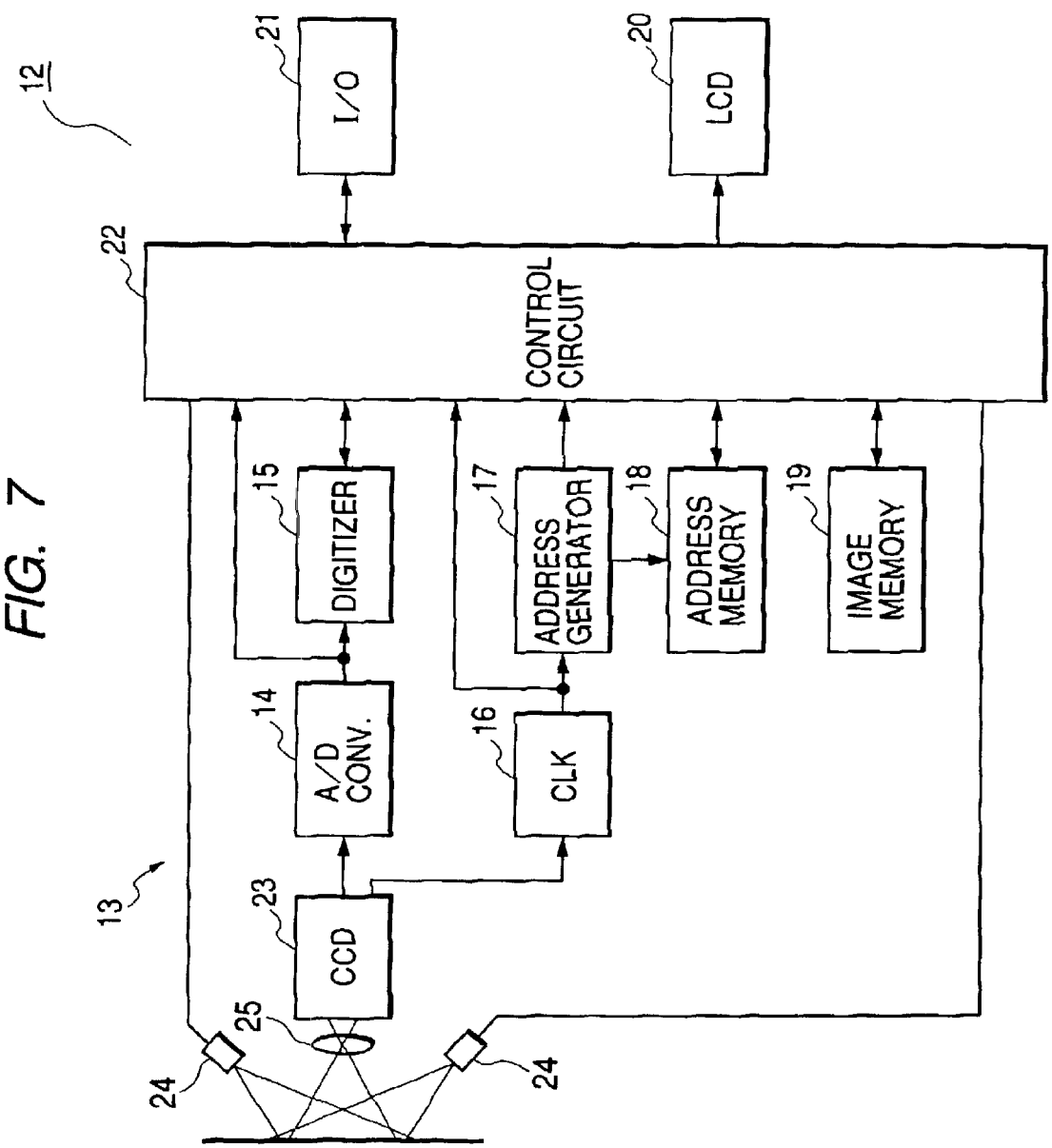
FIG. 7 is a block diagram of an optical information reader.

FIG. 7 is a block diagram of an optical information reader 12 for reading the QR code 11 displayed on a display device 8 of the mobile telephone 1. The optical information reader 12 comprises: an image pick-up camera 13 for photographing an object to be read; an A/D converter 14; a digitizer 15; a clock generator 16; an address generator 17; an address memory 18; an image memory 19; a liquid crystal display (LCD) 20; input/output (I/O) circuit 21 for transmitting and receiving data to and from such a computer as a host computer equipped in a convenience store; and a control circuit 22.

The camera 13 comprises: a CCD area sensor 23 as a two dimensional image detecting means wherein photo-detectors are arranged lengthwise and crosswise; light emitting diodes (LEDs) 24 for illuminating an object; and a lens 25 for focussing on lights reflected from the object on the CCD area sensor 23.

Figure 3:
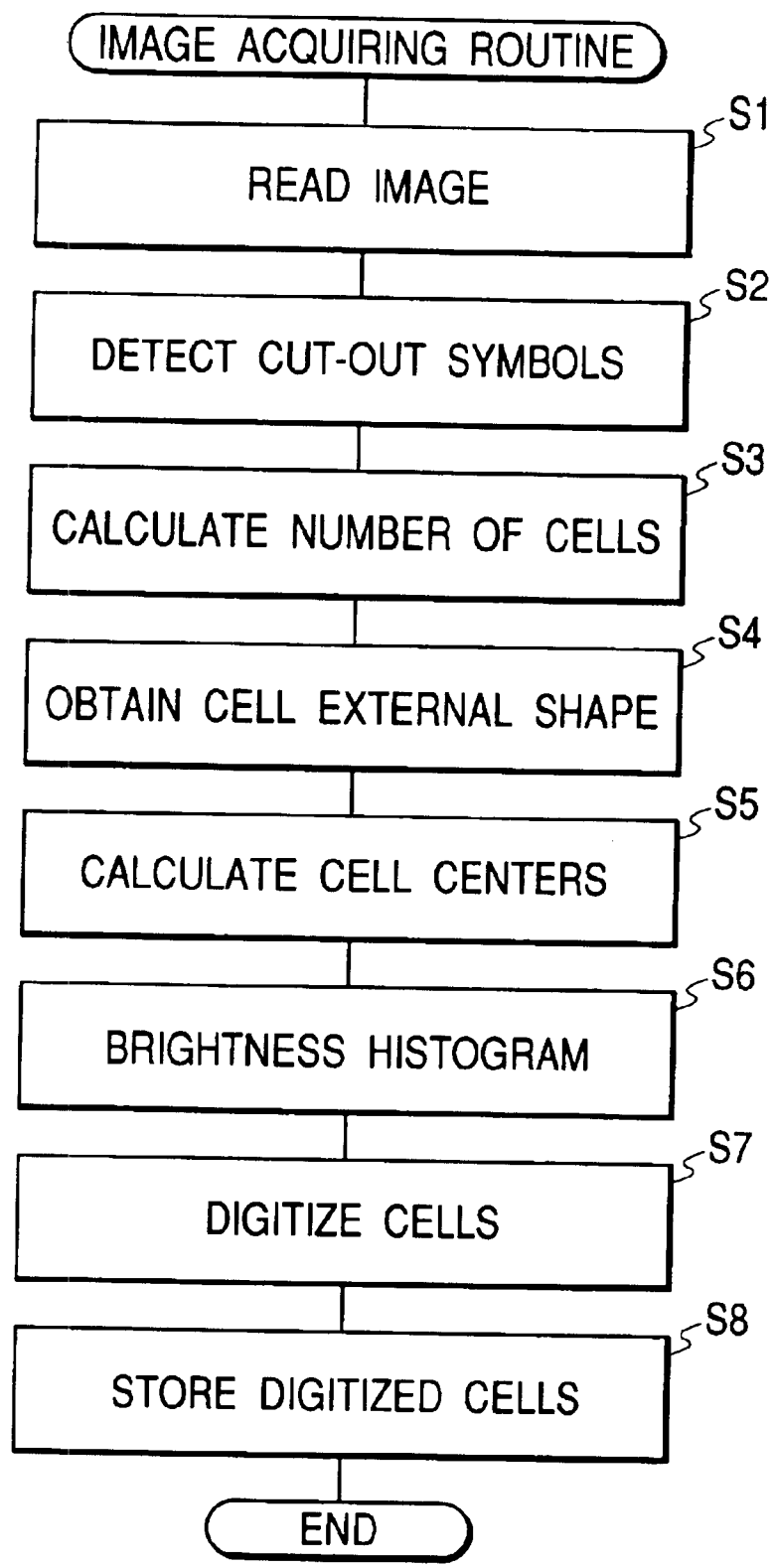
FIG. 3 is a flow chart for obtaining data of the QR code image.

FIG. 3 is a flow chart for reading a digitized image of the QR code 11 photographed by the CCD area sensor 23. When the CCD area sensor 23 detects a two dimensional image, and the image is outputted as a horizontal raster scan signal to the A/D converter. The A/D converter 14 converts the analog raster signal into a multi-level digital signal and sends the digital signal to the digitizer 15 and the control circuit 22. The digitizer 15 digitizes the raster scan signal on the basis of a level instructed by the control circuit 22 and sends the digitized raster scan signal to the control circuit 22.

The clock generator 16 outputs clock pulses sufficiently shorter than the raster scan signal pulses, responding to synchronizing pulses outputted from the CCD area sensor 23, at step S1. The address generating circuit 17 generates an address for the image memory 19, by counting pulses outputted from the clock generating circuit 16. Further, the control circuit 22 stores in the image memory 19 the digitized raster scan signal in the address generated by the address generating circuit 17.

On the other hand, the control circuit 22 stores in its own memory, e.g., RAM. Here, the address of the multiple level raster scan signal stored in the RAM corresponds one by one to the digitized raster scan signal stored in the image memory 19.

Figure 6A:
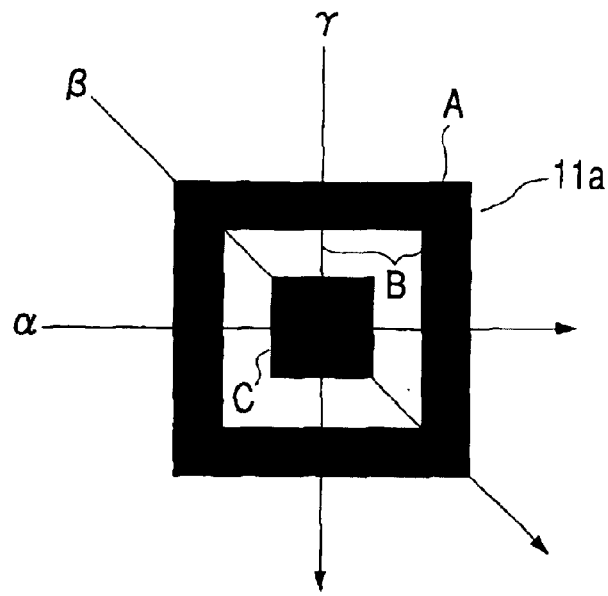
FIGS. 6A through 6D are a cut-out symbol of the QR code and bright and dark pattern along various directions.
Figure 6B:
Figure 6C:
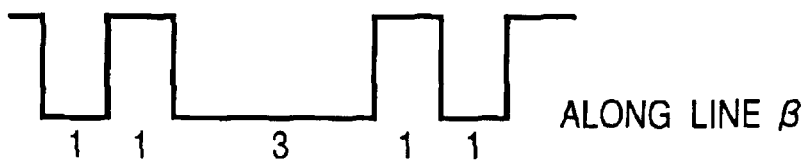
Figure 6D:
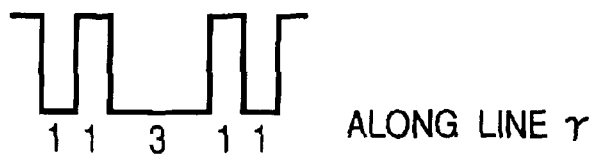

The control circuit 22 detects the cut-out symbol 11a of the QR code 11, on the basis of the digital raster scan signal (two dimensional image) stored in the image memory 19. For example, bright and dark (D and B) patterns picked up along scanning lines α, β, γ of typical angles which passes the center of the cut-out symbol 11a as shown in FIG. 6A are similar in such a manner that the pulse duration of D:B:D:B:D =1:1:3:1:1. The D-B ratios are maintained the same for scanning lines other than lines α, β, γ, as far as they pass the center of the cut-out symbol 11a.

Therefore, when the control circuit 22 detects a partial image of which D-B ration is 1:1:3:1:1, in step S2, the address of the partial image is stored in the address memory 18. Further, the control circuit 22 calculates the distances between two of the three cut-out symbols 11a, on the basis of the partial image addresses, thereby calculating a cell number of the QR code, in step S3.

Next, the control circuit 22 obtains an external shape of the QR code 11, on the basis of three cut-out symbols 11a, at step S4, thereby obtaining central positions (expressed by coordinates of the QR code 11) of cells generated by dividing the external shape by the cell number calculated in step S3. Further, the control circuit 22 detects brightness on the cell center in step S5, by using the multilevel raster scan signal stored in the RAM, thereby preparing histograms as shown in FIGS. 4A and 4B, in step S6.

Figure 4A:
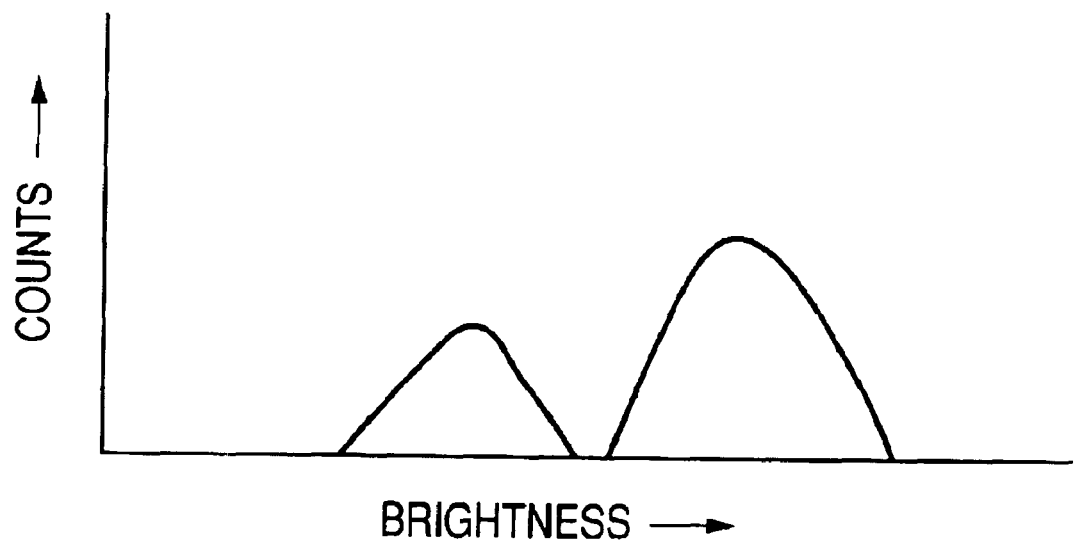
FIGS. 4A and 4B are histrograms of brightness distributions without and with extremely bright and dark area, respectively.
Figure 4B:
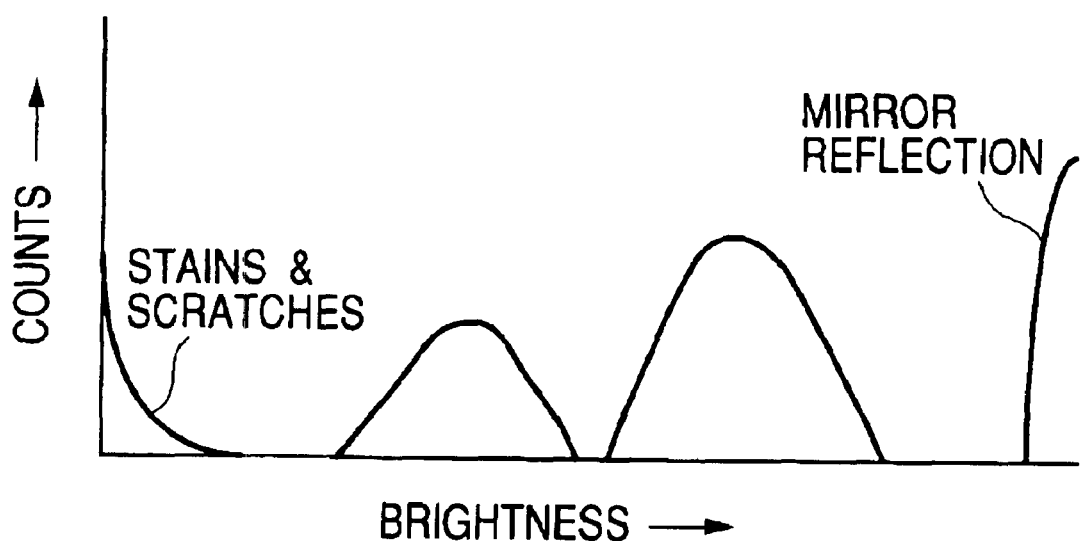

Here, FIG. 4A is a histogram wherein any extremely bright or dark cell is not detected, while FIG. 4B is a histogram wherein extremely bright and dark cells (due to mirror reflections, stains and scratches) are detected.

Next, the control circuit 22 detects thresholds of the brightness of extremely dark and bright cells, thereby detecting their center coordinates, in step S7.

Next, the control circuit 22 deletes the digitized raster scan signal stored in the image memory 19, in order to store the multi level raster scan signal (stored in the RAM except for the extremely bright and dark cells) which is digitized in accordance with a threshold for distinguishing white from black, in step S7. Thus, the image of the QR code 11 is stored in the image memory 19, by eliminating the mirror reflection (extremely bright cells) and stains & scratches (extremely dark cells) which concealed true brightness at their cell positions.

Further, The processes of the information code display on the LCD 8 of the mobile telephone 1 by which commercial transactions are settled.

When a prescribed key switch is activated in order to display the information code, the control circuit 22 displays it on the LCD 8.

The QR code 11 is displayed. e.g., four times at a prescribed time interval, in such a manner that the QR code 11 is moved with each other, for example, the QR code 11 is rotated with each other by 90 degrees around the center of the QR code 11.

Figure 1B:
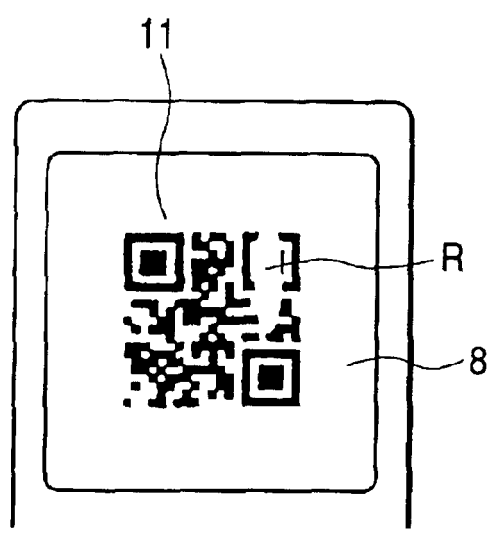
Figure 1C:
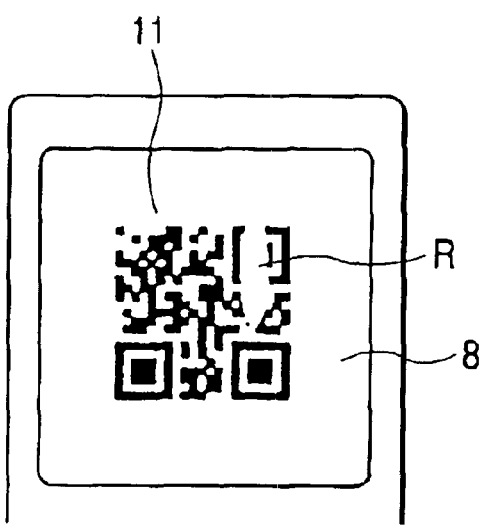
Figure 1D:
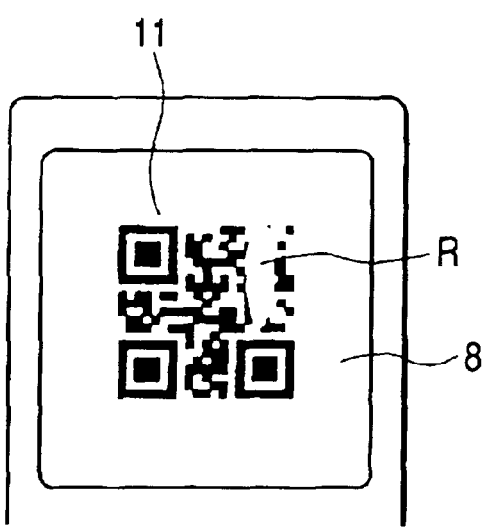

As exemplified in FIG. 1A, the QR code 11 is displayed in such a manner that the three cut-out symbols are positioned at upper left and right sides and at the lower left side at a first display. Further, the QR code 11 is rotated clockwise by 90 degrees at a second display , as shown in FIG. 1B. Further, the QR code 11 is rotated clockwise by 90 degrees at a third display, as shown in FIG. 1C. Further, the QR code 11 is rotated clockwise by 90 degrees at a forth display, as shown in FIG. 1D.

Figure 2:
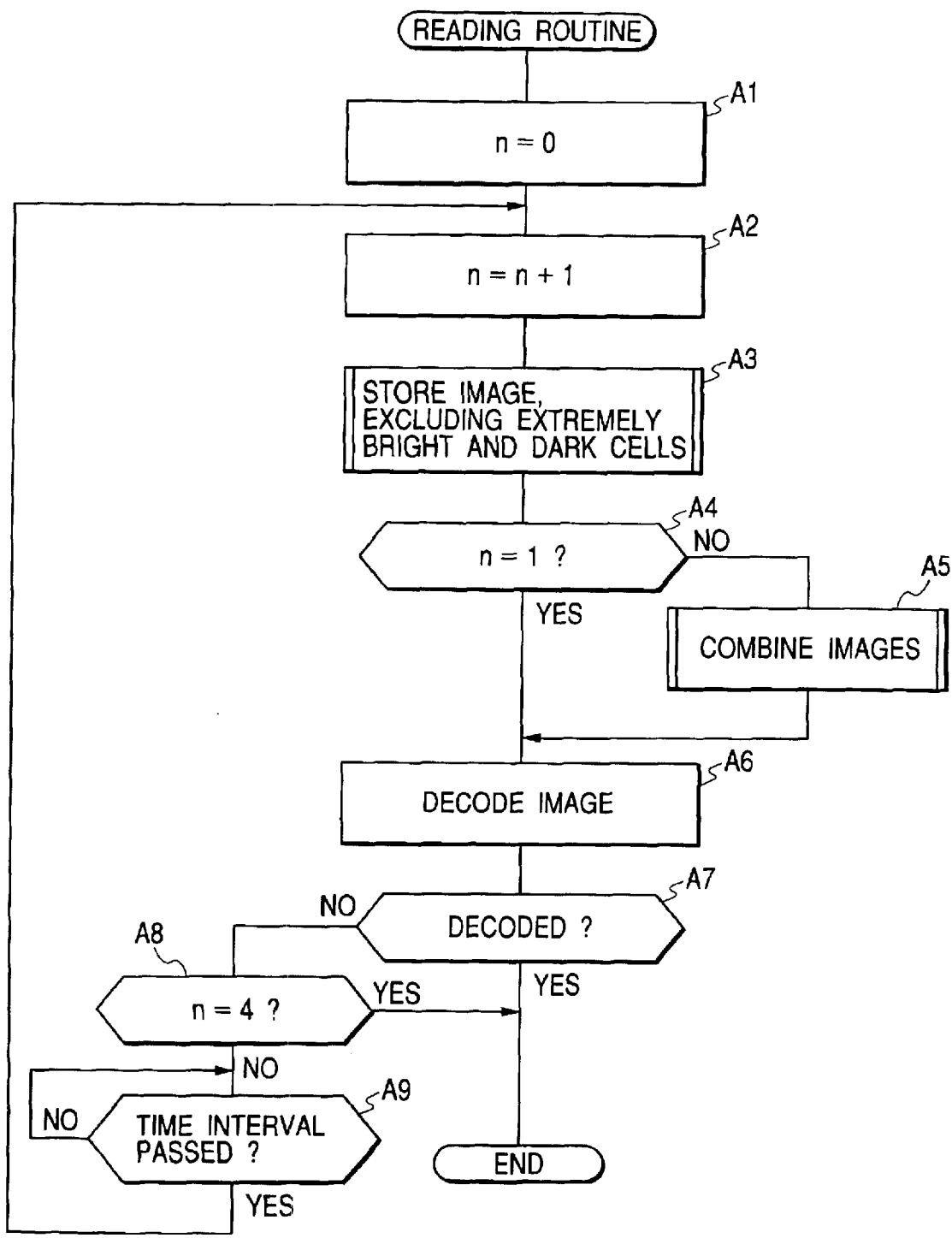
FIG. 2 is a flow chart for reading the QR code in Embodiment 1.

The displayed QR code 11 is read by the optical information reader 12, in accordance with the flow chart as shown in FIG. 2.

When the display 8, e.g., liquid display (LCD) of the mobile telephone 1 approaches the camera 13 of the optical information reader 12, a prescribed key switch of the mobile telephone 1 is activated in order to display the QR code 11 four times.

On the other hand, in step A1, the optical information reader 12 resets the counter "n" for counting the number of times of image reading to zero, when the image reading is started. Then, "n" is incremented by one, in step A2.

Further, the control circuit 22 picks up an image of the QR code 11 by using the CCD camera 23 and stores in the image memory 19 the image of the QR code 11 wherein extremely bright and dark cells are excluded, in step A3.

Next, the control circuit determines whether or not "n" is 1, in step A4. If "n" is 1, step A6 follows, thereby decoding the QR code 11 which is stored in the image memory 19. Further, if the QR 11 is read, at step A7, by error correction, even when the extremely bright and dark cells are excluded, the determination result becomes "YES", thereby completing decoding and ending all the processing steps.

On the other hand, when there are a lot of extremely bright and dark cells, the determination result becomes "NO" in step A7, because the decoding can nor be executed. Then, in the following step A8, the control circuit 22 determines whether or not "n" is four. If "n" is not four, the determination result becomes "NO", the step A9 follows. Further, when a prescribed time period ( same as that for repetitive display on the LCD 8 of the QR code 11) has passed in step A9, then the step A2 follows.

Going back to the step A2, the QR code 11 is rotated clockwise by 90 degrees, is displayed on the LCD 8 and the CCD area sensor 23 picks up the displayed image. Then, the control circuit 22 stores the picked up image, excluding the extremely bright and dark cells. Then, the control circuit 22 determines whether or not "n" is 1 in step A4. The determination result becomes "NO". Accordingly, the step A5 follows, thereby combining the former image stored in the image memory 19 with the present image. If the excluded cells (which were extremely bright and dark) are now digitized, the newly digitized cells are taken into the first picked up image data. Thus, the cells excluded from the image are reduced or completely eliminated.

Next, the control circuit 22 executes the decoding procedure, at step A6, and then determines whether or not the decoding is completed, at step A7. If the decoding is completed, the determination result becomes "YES", thereby ending the image reading. On the other hand, if the decoding is not completed, the determination result becomes "NO", then, follows the step A8 for determining whether or not "n" is four. If "n" is not four, then, the process step goes through the step A9 back to the step A2 for obtaining the displayed image of the QR code 11, and decoding it. Then, if the decoding is completed, at step A7, then, the image reading is ended.

When the decoding is not yet completed even by the four repetitive image scans, the control circuit 22 finishes the image picking-up, on the basis of a determination result "YES" (n=4).

In the present embodiment, The QR code 11 is displayed four times (the QR code 11 is rotated clockwise by 90 degrees every time), at a prescribed time interval. Accordingly, the R portion at the first display as shown in FIG. 1 which was extremely bright (mirror reflection) or extremely dark (stains or scratches) escapes from there. Therefore, the QR code 11 as a whole is digitized by combining the first through fourth displayed images, thereby avoiding a failure of decoding the QR code 11.

Embodiment 2

Figure 10A:
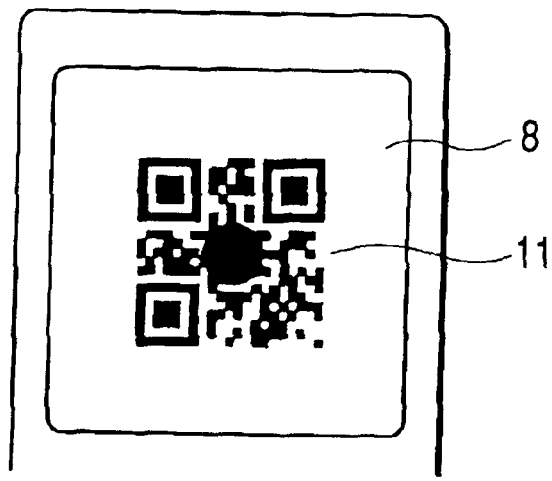
FIGS. 10A to 10C show the QR codes moved in parallel and displayed on a mobile telephone display in Embodiment 2.
Figure 10B:
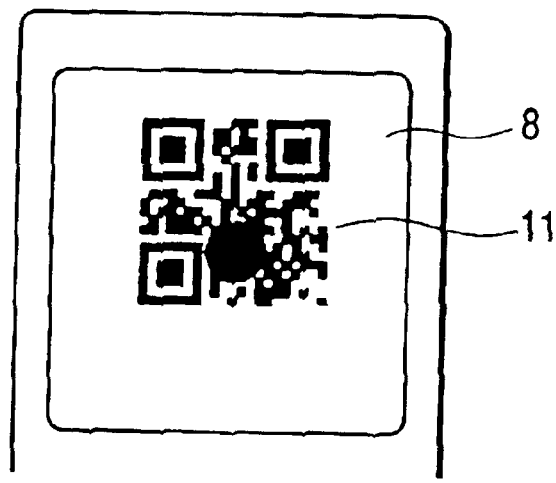
Figure 10C:
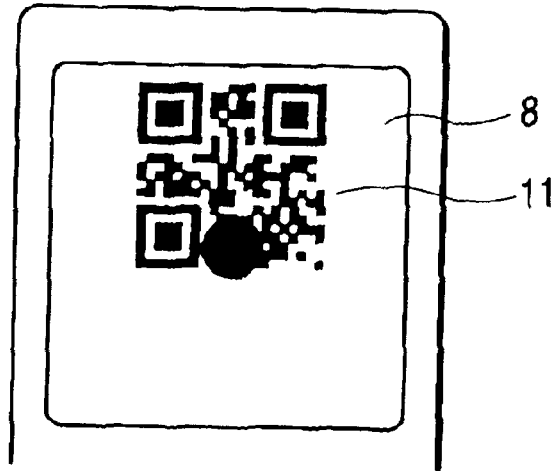

FIGS. 10A, 10B and 10C show Embodiment 2 for another way of displaying the QR code 11 multiple times. The image is shifted in parallel by a prescribed distance. The image may be shifted along the horizontal, vertical, or oblique direction in the coordinate system.

Embodiment 3

Figure 11A:
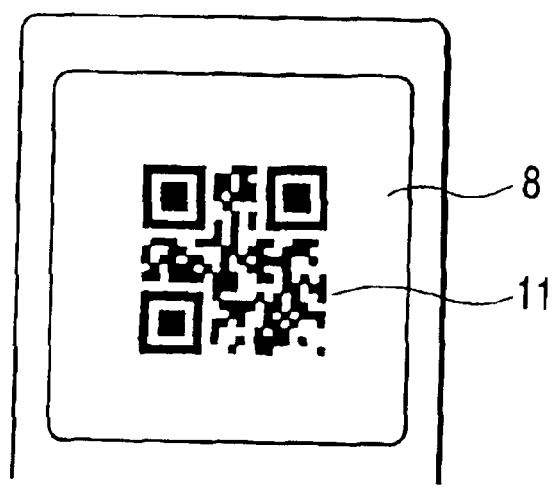
FIGS. 11A to 11C show the QR codes displayed in different on a mobile telephone display in Embodiment 2.
Figure 11B:
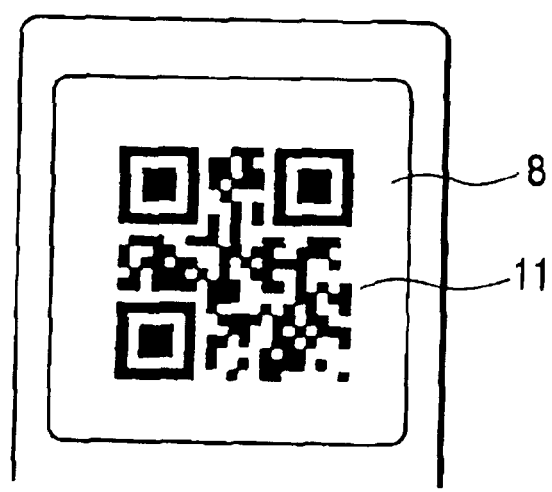
Figure 11C:
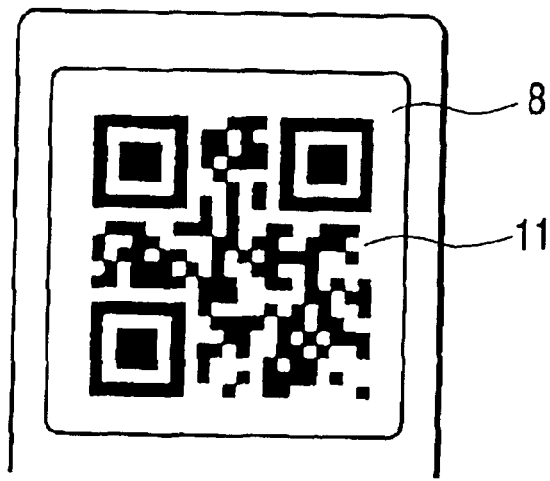
Figure 12:
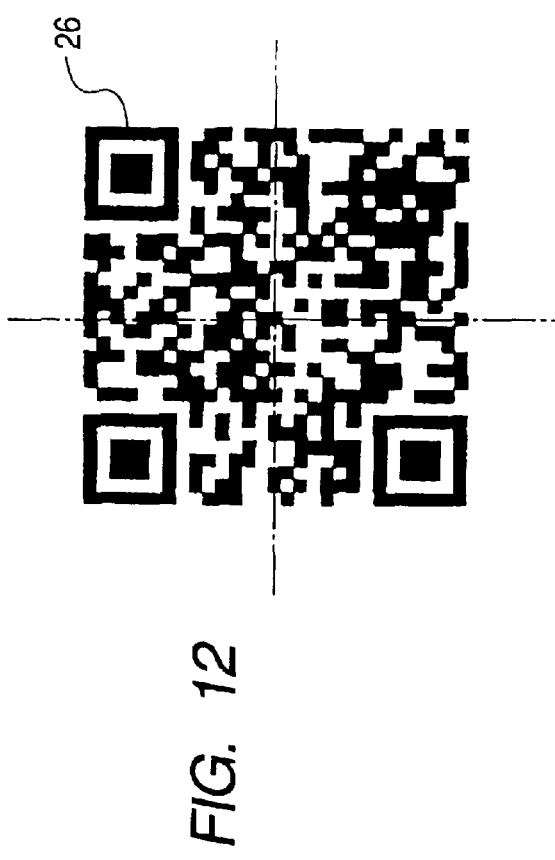
FIG. 12 shows a large QR code to be divided and displayed on a small display of a mobile telephone in Embodiment 4.

As shown in FIGS. 11A, 11B and 11C, the size of the QR code 11 is changed, without moving the center position of the QR code 11. However, when the size of the QR code 11 is changed, the QR code 11 may be rotated or shifted in parallel around or along a fixed or changed center position.

Embodiment 4

Embodiment 4 is explained, referring to FIGS. 12, 13A, 13B, 13C & 13D and FIG. 14. The similar elements in FIG. 1 are designated by the similar reference numerals and their differences only are explained.

In Embodiment 4, a large QR code 26 is displayed on the small LCD 8.

The LCD 8 of the mobile telephone 1 has, in general, about, e.g., 100×100 pixels. Accordingly, if 2×2 pixels are allocated for a cell, the QR code includes at most about 50 Bytes data.

Therefore, in Embodiment 4, the QR code 16 is divided into a plurality of, e.g., 4 regions, which are sequentially displayed on the small LCD 8, thereby transmitting the large QR code 26.

Each of the divided units are displayed as QR codes 26A, 26B, 26C and 26D together with three cut-out symbols, as shown in FIGS. 13A, 13B, 13C and 13D. The data area in QR codes 26A, 26B, 26C and 26D includes originally recorded data in the QR code 26, a number of dividing the QR code 26 and data identifying the divided region.

Figures 13A, 13B, 13C, 13D:
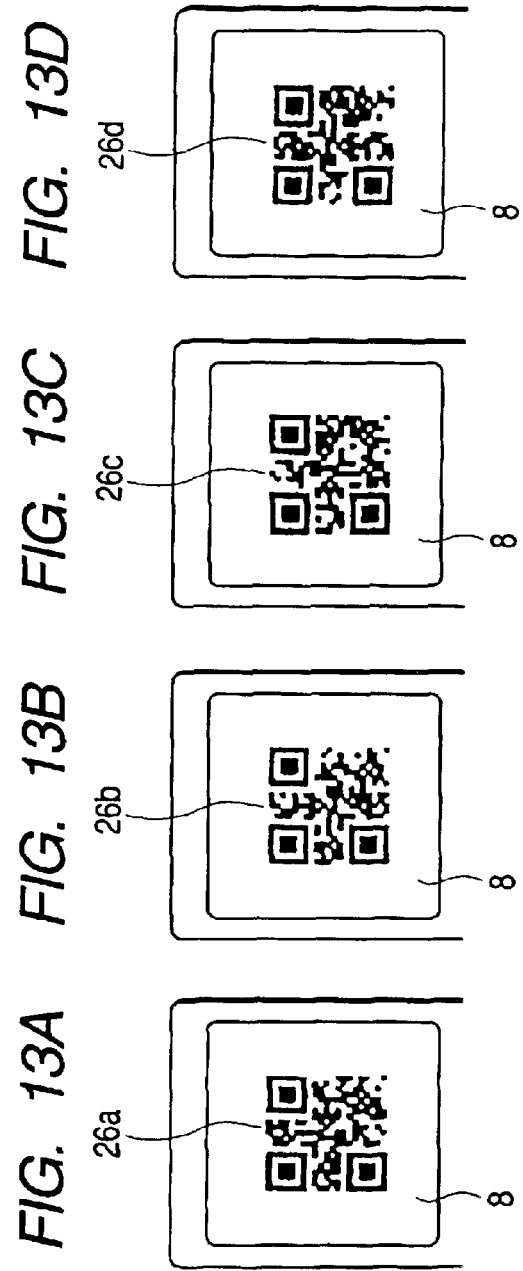
FIGS. 13A to 13D shows the divided images of the large QR code as shown in FIG. 12.

Thus, the upper left region of the QR code 26 is displayed during a first display process, as shown in FIG. 13A, the upper right region of the QR code 26 is displayed during a second display process, as shown in FIG. 13B, the lower right region of the QR code 26 is displayed during a third display process, as shown in FIG. 13C and finally the lower left region of the QR code 26 is displayed during a fourth display process, as shown in FIG. 13D.

Figure 14:
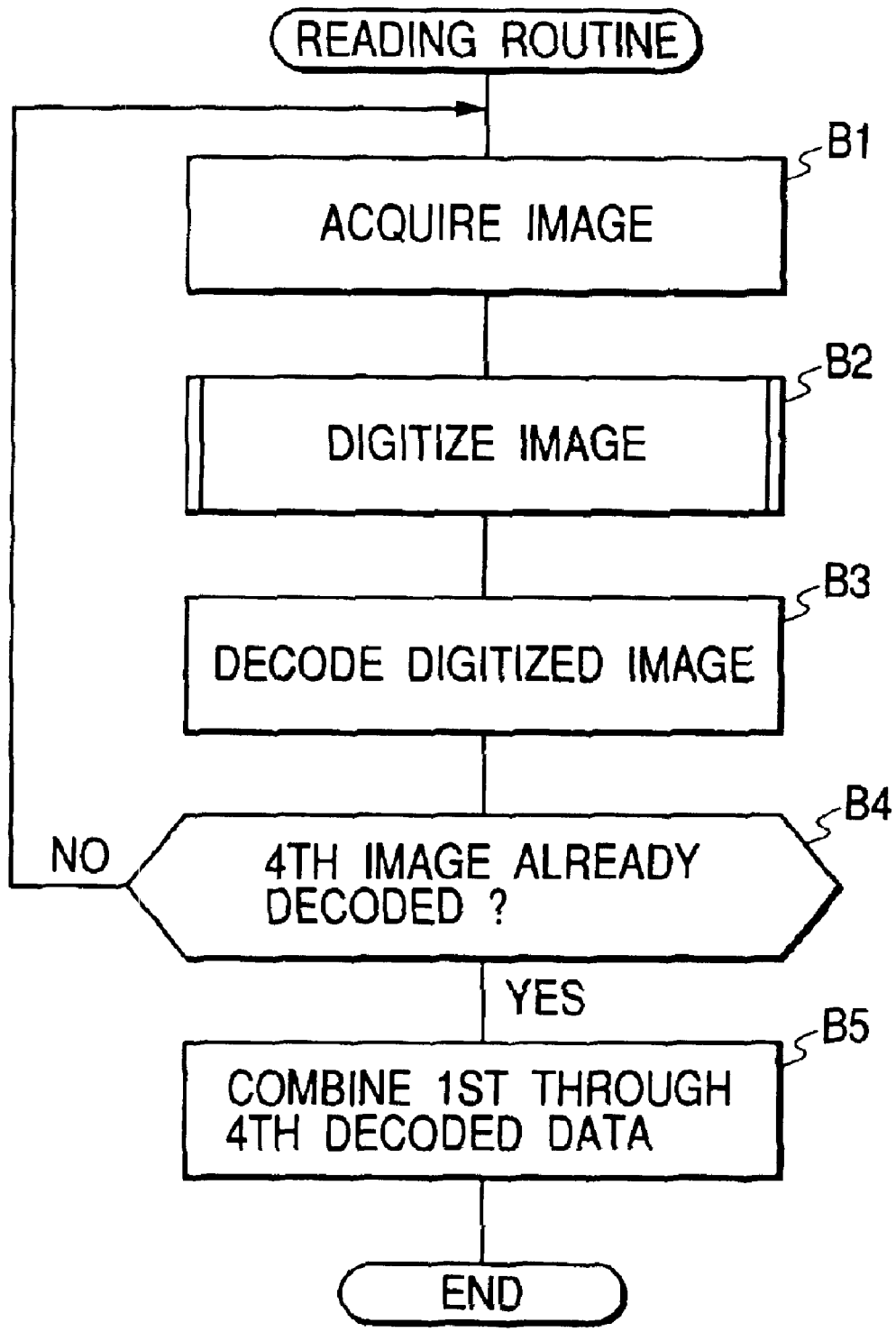
FIG. 14 is a flow chart for operating the optical information reader in Embodiment 4.

FIG. 14 is a flow chart for reading the divided QR codes and decoding the original QR code.

When the first display process is executed, the displayed image is picked up by the CCD area sensor 23 at step BI, and the picked-up image is digitized and stored in the image memory 19 at step B2. Further, the control circuit 22 decodes the stored image and then, stores the decoded data in the RAM at step B3.

Then, the second to fourth displayed images are similarly digitized and decoded at step B4. Then, the control circuit 22 combines the first to fourth decoded data at step B5, thereby obtaining the decoded data of the QR code 26. The step B4 for determining whether the fourth displayed image has already been decoded is executed by reading the total number of divisions of the QR code 26 and data indicating the divided regions.

Here, the total number of divisions and locations of the divided regions may not be recorded, when the total number of divisions and the displaying order are used in the application software of the optical information reader 12.

Embodiment 5

Figure 15:
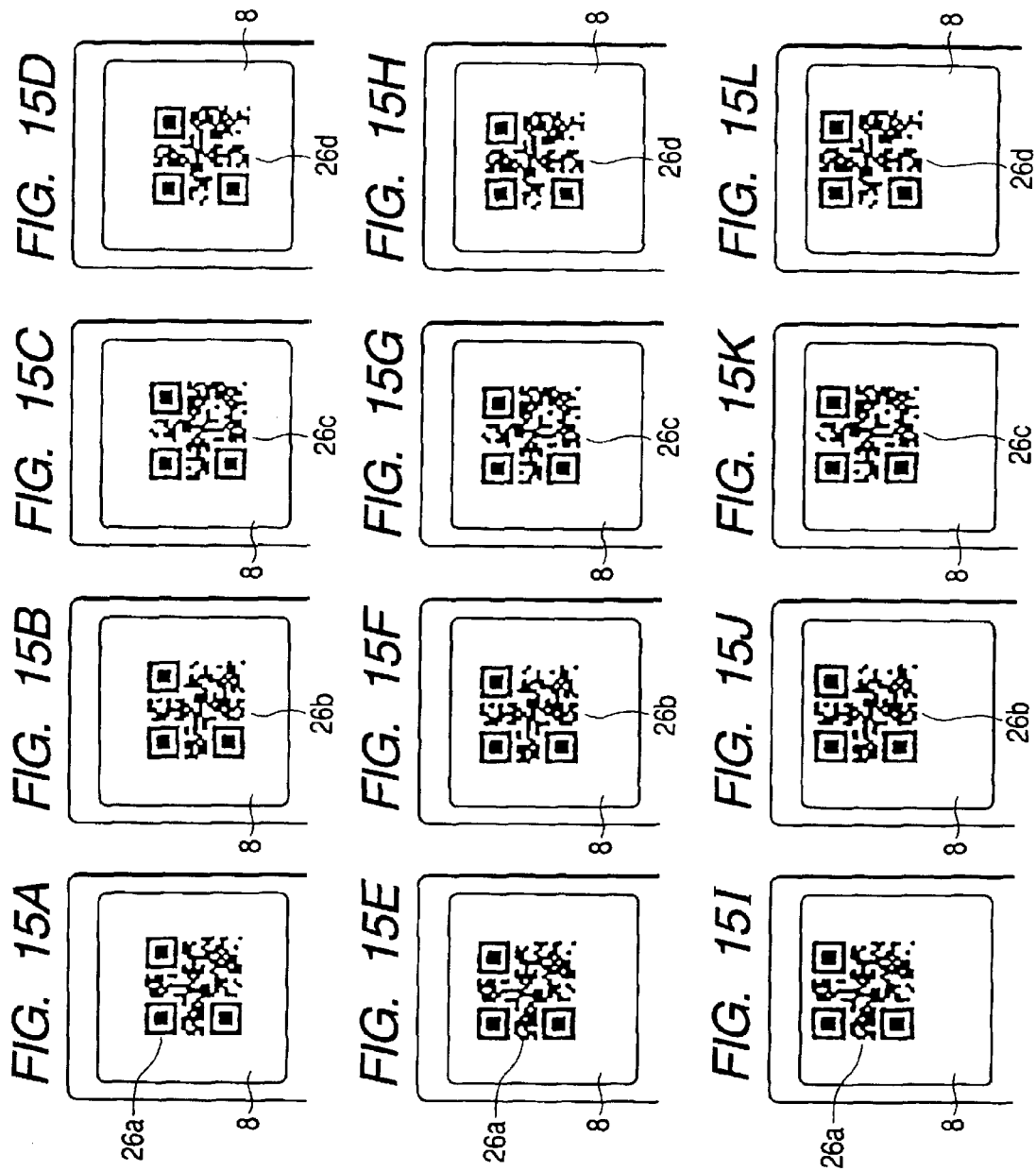
FIGS. 15A to 15L show the four divided image of the large QR code as shown in FIG. 12 which are sequentially displayed three times at a prescribed time interval at different positions in Embodiment 5.
Figure 16:
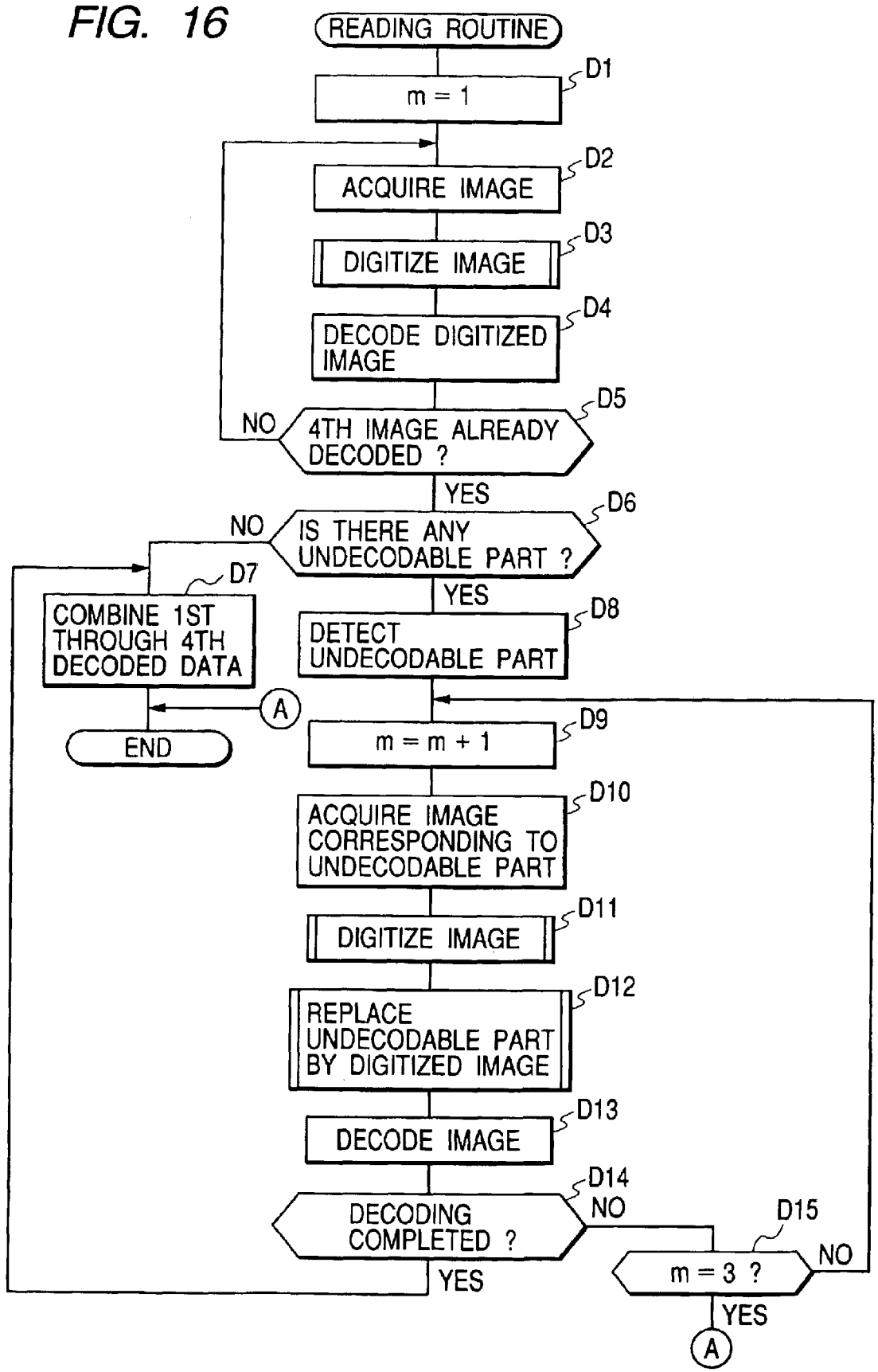
FIG. 16 is a flow chart for operating the optical information reader in Embodiment 5.

Embodiment 5 is explained, referring to FIGS. 15A through 15 L and FIG. 16. In Embodiment 5, The large QR code 26 is divided into four QR coded 26a through 26d each of which is displayed a plurality of times on the LCD 8. Further, the displayed image is shifted each time.

Concretely, the QR codes 26a through 26d are sequentially displayed at a prescribed time interval, and then they are sequentially displayed at a prescribed time interval at a different position. As shown in FIGS. 15A through 15L, they are displayed, e.g., three times.

The optical reader 12 decodes those QR codes 26a through 26d displayed three times as mentioned above, in accordance with the flow chart as shown in FIG. 16.

First, the control circuit 22 resets the counter "m" for counting the display number to be 1 in step D1 and reads the QR code displayed on the LCD 8 by using the CCD area sensor 23 at step D2.

Repeating four times from steps D3 to D5, the control circuit 22 digitizes and decodes sequentially the QR codes 26a through 26d.

Next, at step D6, the control circuit 22 determines whether or not there is any codes which could not decoded. If there is not any codes which could not decoded (all codes could be decoded), the control circuit combines the QR codes 26a through 26d at step D7. Thus, the reading routine is ended.

On the other hand, if there are one or more codes which could not be decoded, the control circuit 22 identifies the codes which could not be decoded at step D8, increments "m" by 1 at step D9, reads the identified code images among the code images displayed at second time at step D10, digitizes the identified code image at step 11, replaces the codes which could not be decoded by the identified codes at step 12.

when the identified codes could be decoded, the decoding is determined to be completed at step D14 and step D7 follows, thereby finishing the reading routine. On the other hand, when the identified codes could not be decoded even after the image replacement at step 12, the decoding is determined not to be completed at step 14 and then step 15 follows for counting the display number "m". If "m" is 3 at step D15, the reading routine is ended up. On the other hand, if "m" is not 3, then step D9 follows in order to pick up again and decodes the image.

The present invention is not limited to the above-explained preferred embodiments, but modification thereof within the scope of the present invention are possible.

Images of one dimensional codes (bar code) as well as the two dimensional codes may be picked up by the optical information reader of the present invention.

Further, the QR code in Embodiment 5 may be moved in accordance with Embodiments 2 and 3.

What is claimed is:

1. A method comprising: displaying a plurality of images in succession, each of the plurality of images including an information code being common to the plurality of images, the information code being positioned in a different display area for the each of the plurality of images than for others of the plurality of images; and optically reading the information code from one of the displayed plurality of images, a part of the information code displayed in a portion of the display other than an unrecognizable portion, the information code being obtained when the part of the information code from another of the displayed plurality of images, the another part of the information code displayed in the unrecognizable portion, is not optically read.

2. The method according to claim 1, wherein the displaying the plurality of images includes forming each of the plurality of images from an original image by rotating the original image by a predetermined angle.

3. The method according to claim 1, wherein the displaying the plurality of images includes forming each of the plurality of images from an original image by moving the original image in parallel by a predetermined distance.

4. The method according to claim 1, wherein the displaying the plurality of images includes forming each of the plurality of images from an original image by changing a size of the original image.

5. The method according to claim 1, wherein the optically reading the information code includes:

examining a brightness of each of the displayed plurality of images;

judging that the part of the each of the displayed plurality of images is displayed in the unrecognizable portion when the part of the each of the displayed plurality of images has a brightness having one of a greater brightness than a first predetermined brightness and a lesser brightness than a second predetermined brightness; and discarding partial information obtained from the part of the each of the plurality of images.

6. The method according to claim 1, wherein the information code optically read includes an information code used for a commercial transaction.

7. The method according to claim 1, wherein the displaying the plurality of images includes displaying the each of the plurality of images according to a predetermined time interval.

8. A method comprising:

dividing an information code into a plurality of partial information codes;

displaying a plurality of partial images in succession indicating the plurality of of partial information codes respectively such that each of the plurality of partial images includes a code indicating one or more of a dividing number and a display order of the each;

reading optically the plurality of partial information codes indicated in the displayed plurality of partial images; and combining the partial information codes to obtain the information code.

wherein the reading optically the plurality of partial information codes includes obtaining a part of a one of the plurality of partial information codes indicating a one of the plurality of partial images, the part displayed in a portion other than an unrecognizable portion when the part of another of the plurality of partial information codes indicating another of the plurality of partial images displayed in the unrecognizable portion is not optically read.

* * * * *